United States Patent [19]

Yatka et al.

[11] Patent Number: 5,139,798
[45] Date of Patent: Aug. 18, 1992

[54] POLYVINYL ACETATE ENCAPSULATION OF CODRIED SUCRALOSE FOR USE IN CHEWING GUM

[75] Inventors: Robert J. Yatka, Orland Park; Kevin B. Broderick, Berwyn; Joo H. Song, Northbrook; Steven E. Zibell, Tinley Park; Marc A. Meyers, Naperville; Adebisi A. Campbell, Chicago, all of Ill.

[73] Assignee: Wm. Wrigley Jr. Company, Chicago, Ill.

[21] Appl. No.: 721,616

[22] PCT Filed: Nov. 21, 1990

[86] PCT No.: PCT/US90/06833

§ 371 Date: Jul. 17, 1991

§ 102(e) Date: Jul. 17, 1991

[51] Int. Cl.$^5$ .............................................. A23G 3/30
[52] U.S. Cl. ........................................ 426/5; 426/548; 426/96
[58] Field of Search ................ 426/36, 96, 548, 804

[56] References Cited

U.S. PATENT DOCUMENTS

| | | | |
|---|---|---|---|
| 4,139,639 | 2/1979 | Bahoshy et al. | 426/3 |
| 4,230,687 | 10/1980 | Sair et al. | 424/22 |
| 4,343,934 | 8/1982 | Jenner et al. | 536/122 |
| 4,384,004 | 5/1983 | Cea et al. | 426/5 |
| 4,386,106 | 5/1983 | Merritt et al. | 426/5 |
| 4,389,394 | 6/1983 | Drucker | 424/53 |
| 4,405,654 | 9/1983 | Lee | 426/658 |
| 4,435,440 | 3/1984 | Hough et al. | 426/658 |
| 4,495,170 | 1/1985 | Beyts et al. | 426/658 X |
| 4,515,769 | 5/1985 | Merritt et al. | 426/3 X |
| 4,549,013 | 10/1985 | Hough et al. | 426/658 X |
| 4,556,565 | 12/1985 | Arima et al. | 426/3 |
| 4,597,970 | 7/1986 | Sharma et al. | 426/5 |
| 4,612,373 | 9/1986 | Kahn et al. | 426/3 X |
| 4,634,593 | 1/1987 | Stroz et al. | 426/5 |
| 4,740,376 | 4/1988 | Yang | 426/5 |
| 4,816,265 | 3/1989 | Cherukuri et al. | 426/5 |
| 4,820,528 | 4/1989 | Stroz et al. | 426/3 |
| 4,824,681 | 4/1989 | Schobel et al. | 426/5 |
| 4,863,745 | 9/1989 | Zibell | 426/5 |
| 4,929,447 | 5/1990 | Yang | 424/440 |
| 4,933,190 | 6/1990 | Cherukuri et al. | 426/5 |
| 4,978,537 | 12/1990 | Song | 426/5 |
| 4,981,698 | 1/1991 | Cherukuri et al. | 426/5 |
| 4,986,991 | 1/1991 | Yatka et al. | 426/3 |
| 5,000,965 | 3/1991 | Killeen et al. | 426/5 |
| 5,057,328 | 10/1991 | Cherukuri et al. | 426/5 |

FOREIGN PATENT DOCUMENTS

| | | | |
|---|---|---|---|
| 47-20369 | 9/1972 | Japan . | |
| 2065646 | 7/1981 | United Kingdom . | |
| 2065648 | 7/1981 | United Kingdom . | |
| 2153651 | 8/1985 | United Kingdom . | |
| 2154850 | 9/1985 | United Kingdom . | |
| 2185674 | 7/1987 | United Kingdom . | |
| 88/08672 | 11/1988 | World Int. Prop. O. . | |
| 89/03170 | 4/1989 | World Int. Prop. O. . | |
| 89/11212 | 11/1989 | World Int. Prop. O. . | |
| 90/07859 | 7/1990 | World Int. Prop. O. . | |
| 90/07864 | 7/1990 | World Int. Prop. O. . | |
| 90/13994 | 11/1990 | World Int. Prop. O. | 426/5 |
| 91/07102 | 5/1991 | World Int. Prop. O. . | |
| 91/07103 | 5/1991 | World Int. Prop. O. . | |
| 91/07104 | 5/1991 | World Int. Prop. O. . | |

*Primary Examiner*—Jeanette Hunter
*Attorney, Agent, or Firm*—Willian, Brinks, Olds, Hofer, Gilson & Lione

[57] ABSTRACT

A sucrose-containing chewing gum ingredient is prepared by codrying sucralose with a codrying agent and homogeneously mixing about 50 to about 97 parts by weight heat-softened polyvinyl acetate with about 3 to about 50 parts by weight of the codried sucralose. The mixture is then cooled. A chewing gum is prepared by mixing the sucralose-containing ingredient, gum base, a bulking agent and flavor to make a chewing gum composition.

22 Claims, No Drawings

POLYVINYL ACETATE ENCAPSULATION OF CODRIED SUCRALOSE FOR USE IN CHEWING GUM

CROSS REFERENCE TO RELATED APPLICATION

This application is a continuation-in-part of Application PCT/US89/05296, filed Nov. 22, 1989 and titled Method of Controlling Release of Sucralose in Chewing Gum and Gum Produced Thereby, the disclosure of which is hereby incorporated by reference.

FIELD OF THE INVENTION

The present invention relates to chewing gum, and more particularly to the use of a polyvinyl acetate encapsulated, codried sucralose in a chewing gum.

BACKGROUND OF THE INVENTION

Chewing gums comprise many ingredients, including sweeteners. Sweeteners suitable for chewing gums include both natural and artificial sweeteners. Recently, high-intensity sweeteners have been the focus of investigation for use in chewing gum.

High-intensity sweeteners may be hundreds of times sweeter than natural sweeteners such as sucrose and glucose. High-intensity sweeteners of recent interest include aspartame, acesulfame K, cyclamates, saccharin, and now sucralose. Sucralose is a new, high-intensity sweetener which is a tri-chlorinated sucrose derivative and is about 400-800 times sweeter than sucrose. Sucralose has been reported to be cheaper than aspartame and at least 3 times sweeter. Compared to some other high-intensity sweeteners, sucralose has a sweet taste more similar to sucrose. Chemically, sucralose is known as 4,1',6'-trichloro-4,1', 6'-trideoxy-galactosucrose, or alternatively 1,6'-dichloro-1,6-dideoxy-($\beta$)-D-fructofuranosyl 4-chloro-4-deoxy-($\alpha$)-D-galactopyranoside. The United States Food and Drug Administration is now considering sucralose as a food additive. The manufacturer of sucralose is Tate & Lyle, Inc. in the U.K. Sucralose is marketed in the United States by McNeil Specialty Products Co., Skillman, N.J. Its use to sweeten substances, including oral compositions, is disclosed in U.S. Pat. Nos. 4,343,934 and 4,389,394, both of which are incorporated herein by reference. The use of sucralose as an artificial sweetener is also disclosed in U.K. Patent Nos. 2,065,646; 2,065,648 and 2,153,651.

The use of sucralose in chewing gum has been disclosed in other patents.

U.S. Pat. No. 4,495,170 discloses sweetener mixtures for use in foods, beverages and pharmaceuticals but not specifically chewing gums. The mixtures are of sucralose and aspartame, saccharin, and acesulfame K. U.S. Pat. No. 4,389,394 discloses the use of artificial sweeteners in chewing gum to prevent dental caries. Chlorinated sucrose derivatives are disclosed in U.S. Pat. Nos. 4,435,440; 4,549,013; and 4,612,373.

U.K. Patent No. 2,154,850 discloses beverages sweetened with sucralose and cyclamate (among others).

U.K. Patent No. 2,185,674 discloses combinations of thaumatin and sucralose (among others) to stimulate growth of farm animals.

U.S. Pat. No. 4,820,528 discloses co-dried sucralose and acid saccharin to prolong sweetness release.

One of the limitations of chewing gum is that the sweetness and flavor are rapidly lost during chewing. Thus, chewing gum producers are constantly trying to extend the time in which a consumer of chewing gum can enjoy its flavor and sweetness.

Patents disclose how a sweetener like aspartame can be physically modified to control the release rate in chewing gum.

For example, U.S. Pat. No. 4,597,970 to Sharma et al. teaches a process for producing an agglomerated sweetener wherein the sweetener is dispersed in a hydrophobic matrix consisting essentially of lecithin, a glyceride, and a fatty acid or wax having a melting point between 25 and 100° C. The method disclosed uses a spray-congealing step to form the sweetener-containing matrix into droplets, followed by a fluid-bed second coating on the agglomerated particles.

U.S. Pat. Nos. 4,515,769 and 4,386,106, both to Merrit et al., teach a two step process for preparing a delayed release flavorant for chewing gum. In this process, the flavorant is prepared in an emulsion with a hydrophilic matrix. The emulsion is dried and ground and the particles are then coated with a water-impermeable substance.

U.S. Pat. No. 4,230,687 to Sair et al. teaches a process for encasing an active ingredient to achieve gradual release of the ingredient in a product such as chewing gum. The method described involves adding the ingredient to an encapsulating material in the form of a viscous paste. High-shear mixing is used to achieve a homogeneous dispersion of the ingredient within the matrix, which is subsequently dried and ground.

U.S. Pat. No. 4,139,639 to Bahoshy et al. teaches a process of "fixing" aspartame by co-drying (by spray drying or fluid-bed coating) a solution containing aspartame and an encapsulating agent, such as gum arabic, to thereby surround and protect the aspartame in the gum during storage.

U.S. Pat. No. 4,384,004 to Cea et al. teaches a method of encapsulating aspartame with various solutions of encapsulating agents using various encapsulation techniques, such as spray drying, in order to increase the shelf-stability of the aspartame.

U.S. Pat. No. 4,634,593 to Stroz et al. teaches a method for producing controlled release sweeteners for confections, such as chewing gum. The method taught therein involves the use of an insoluble fat material which is mix mulled with the sweetener.

PCT Publication WO90/07859 discloses a number of techniques, including encapsulation techniques, for delaying the release of sucralose from chewing gum. In example 18 of the publication, sucralose is mixed with polyvinyl acetate and the combined material is added to other gum base ingredients and made into gum.

It is known that the sweetness and flavor can be extended in chewing gum by using high levels of high intensity sweeteners such as aspartame. The extension properties of those sweeteners, however, are limited by their release characteristics during chewing of the gum. Providing a chewing gum having improved sweetness and flavor extension is one object of this invention.

Sucralose, when modified according to the present invention and incorporated into chewing gum, gives a chewing gum having a controlled-release sweetener. A higher quantity of sweetener can be used without resulting in excessive initial sweetness, but instead having a delayed sweetness release, giving a highly consumer-acceptable chewing gum product.

SUMMARY OF THE INVENTION

The present invention includes sucralose-containing chewing gum ingredients and methods of making the ingredients. The methods include the steps of codrying sucralose with a codrying agent, homogeneously mixing about 50 to about 97 parts by weight heat-softened polyvinyl acetate (PVAc) with about 3 to about 50 parts by weight of the codried sucralose, and cooling the homogeneous mixture, leaving a blended sucralose-containing ingredient.

The invention also includes chewing gum compositions containing the sucralose-containing ingredient and methods of making the gum. The gum making methods include the steps of providing the sucralose-containing ingredient as outlined above, and mixing the same with gum base, a bulking agent and flavoring agent to make a chewing gum composition.

It has been found that the sucralose incorporated in chewing gum using the sucralose-containing ingredient of the present invention is surprisingly slow to release from the gum. Thus the invention provides a very simple but effective delay release mechanism for sucralose.

DETAILED DESCRIPTION OF THE PREFERRED EMBODIMENTS OF THE INVENTION

As used herein, the term "chewing gum" includes chewing gum, bubble gum and the like. Unless specified otherwise, all percents used herein are weight percents.

The first step in preparing the sucralose-containing ingredient of the present invention is to codry the sucralose with a codrying agent. Codrying is a general term for a process in which an active ingredient and a carrier or codrying agent are dissolved or suspended in a liquid carrier which is then evaporated to produce an intimately mixed, dry combination ingredient. Specific processes for carrying out codrying operations include the well known processes of spray drying, freeze drying and moist granulation. The moist granulation process has been disclosed in U.S. Pat. Applications Serial Nos. 06/921,753 and 06/921,754. U.S. Patent No. 4,863,745, incorporated herein by reference, also discloses moist granulation processes.

Any codrying method can be used, with spray drying and moist granulation being preferred. With some codrying agents, freeze drying may also be suitable.

The most preferred codrying agent is maltodextrin. Other preferred codrying agents include hydroxy propyl methyl cellulose, gum arabic and hydroxy propyl cellulose. The ratio of sucralose to codrying agent in the codried product is contemplated to be between about 20% and about 80%. Levels of about 35% to about 65% are preferred, with 50% being most preferred.

The next step is to homogeneously mix heat-softened PVAc and the codried sucralose. The PVAc used in the present invention will be a food grade polymer. The molecular weight of the polymer is not believed to be critical to working of the invention, but certain molecular weights may be easier to use to produce the blended ingredient and others may be more effective at extending the release rate of sucralose. Specifically, lower molecular weights of PVAc tend to be easier to mix and reduce the effort necessary to clean out the mixing apparatus afterwards. However, there is some evidence that higher molecular weights provide slightly slower release.

The contemplated molecular weight range of PVAc usable in the present invention is from about 7000 to about 100,000 molecular weight units (MWU). The preferred range is from about 10,000 MWU to about 50,000 MWU and most preferred are polymers of about 15,000 MWU to about 32,000 MWU. (The preceding molecular weight numbers are based on average molecular weight as measured by Gel Permeation Chromatography. Other methods of measuring molecular weights of polymers may give substantially different values.)

The level of codried sucralose used in the PVAc blend can vary greatly. An upper limit would be just below the amount where the sucralose loading is so high that the PVAc can no longer form a film upon cooling. Levels of sucralose in the final blend in the range of about 3% to about 50% are specifically contemplated, while about 15% to about 35% is preferred. The most preferred level is about 20% to about 30%. The exact level chosen will depend on the intended usage level of this ingredient in the final gum composition.

A variety of methods of preparing the PVAc/sucralose blends of the present invention are contemplated. A fiber spinning method as disclosed in U.S. patent applications Ser. Nos. 07/418,662 and 07/340,384, incorporated herein by reference, may be used. The PVAc/sucralose blend may also be mixed in a conventional sigma blade gum mixer. Any other type of mixer suitable for the task may also be used. Usually heat will be used to soften the PVAc to aid mixing. Preferred temperatures for mixing are in the range of 100 to 212° F.

In mixing process, the PVAc may be softened before mixing it with the codried sucralose. Alternatively, the PVAc and codried sucralose may be mixed together and then heated. After the mixing process, the blended ingredient must be cooled. After cooling, the ingredient is preferably sized, usually by grinding and/or sieving to provide the desired particle size. The particle size should be small enough so as not to be noticeable in the finished gum. Excessively fine particles may lose some of the slow release benefit, but in practice, this is not a serious problem. The preferred particle size is less than about 420 microns. Usually a size range of about 80 microns to about 400 microns is desirable.

The usage level of the encapsulated ingredient in gum will vary with the active level of sucralose in the encapsulation. In general, the usage level will be calculated to give a desired level of active sucralose in the gum. Usage levels of the encapsulated ingredient of about 0.02 percent to about 20 percent are therefore contemplated. The actual optimized usage level may be higher than might be theoretically calculated due to the slower release rate of the blended ingredient. Depending on the desired sweetness level and the presence of other sweeteners in the gum, the active sucralose level may vary from about 0.01% to about 0.50% or even higher.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinyl acetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 80 percent by weight of the gum. More preferably the insoluble gum base comprises between 10 and 50 percent by weight of the gum and most preferably about 20 to about 35 percent by weight of the gum.

The gum base typically also includes a filler component. The filler component may be calcium carbonate, magnesium carbonate, talc, dicalcium phosphate or the like. The filler may constitute between about 5 and about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

The sucralose-containing ingredient of the present invention will most likely be used in sugarless gum formulations. However, formulations containing sugar are also within the scope of the invention. Sugar sweeteners generally include saccharide- containing components commonly known in the chewing gum art which comprise, but are not limited to, sucrose, dextrose, maltose, dextrin, dried invert sugar, fructose, levulose, galactose, corn syrup solids and the like, alone or in any combination. Generally sugarless sweeteners include components with sweetening characteristics but which are devoid of the commonly known sugars and comprise, but are not limited to, sugar alcohols such as sorbitol, mannitol, xylitol, hydrogenated starch hydrolysates, maltitol and the like, alone or in any combination.

These sugar and sugarless sweeteners often also serve the role as bulking agents in chewing gum. The bulking agent generally comprises from about 5 percent to about 80 percent of the gum composition.

Depending on the particular sweetness release profile and shelf-stability needed, the sucralose-containing ingredient of the present invention can also be used in combination with uncoated high-potency sweeteners or with high-potency sweeteners coated with other materials and by other techniques. In particular, sucralose treated to increase its release rate as described in U.S. patent application Ser. No. 07/376,037, incorporated herein by reference, may be used in conjunction with the present invention.

A flavoring agent may be present in the chewing gum in an amount within the range of from about 0.1 to about 10.0 weight percent and preferably from about 0.25 to about 5 weight percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form, such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent. Further portions of the bulking agent may then be added to the mixer. A flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

The blended sucralose-containing ingredient may be added at any point in the gum making process. The preferred point is with the first bulk sweetener addition. Very early addition into hot base is undesirable since the PVAc may soften or melt.

EXAMPLE 1

A spray dried sucralose composition was prepared by dissolving 800g of sucralose and 800g maltodextrin in 2400g of distilled water. The pH of the water was adjusted to 5.9 by addition of 10% citric acid solution. This solution was heated to 95° F. and fed into a Niro spray drier. The inlet temperature was 195° C., and the outlet temperature was 80° C. The nozzle was in a counter-current position. The run took 27 minutes.

The spray dried sucralose was next used to prepare a PVAc blend. Ground PVAc having a molecular weight of 15,000 was dry blended with the spray dried sucralose in an 80:20 ratio (by weight PVA: spray dried product). The dry blend was added to a sigma blade mixer at 130° F and mixed until homogeneous, about 10 minutes. The mixture was then cooled and ground in a Fitzmill grinder with a 0.109 inch screen. The product was then sieved and the fraction between 40 and 325 U.S. Standard Mesh size was used. The product contained 10% sucralose by weight.

EXAMPLE 2

The method of Example 1 was repeated except that the ratio of PVAc to spray dried material in the PVAc/codried sucralose blend was 70:30. The product contained 15% sucralose by weight.

EXAMPLE 3

The method of Example 1 was repeated except that the ratio of PVAc to spray dried material in the PVAc/codried sucralose blend was 60:40. The product contained 20% sucralose by weight.

EXAMPLES 4, 5, 6 (CHEWING GUMS)

Chewing gums were made according to the following formulas (in percent by weight).

|  | Example 4 | Example 5 | Example 6 |
|---|---|---|---|
| Sugar | 53.455 | 53.555 | 53.605 |
| Base | 22.255 | 22.255 | 22.255 |
| Corn Syrup | 5.130 | 5.130 | 5.130 |
| Glycerin | 2.000 | 2.000 | 2.000 |
| Calcium Carbonate | 2.000 | 2.000 | 2.000 |
| 10% Salt Solution | 0.100 | 0.100 | 0.100 |
| Dextrose | 13.410 | 13.410 | 13.410 |
| Spearmint Flavor | 1.350 | 1.350 | 1.350 |
| Ingredient of Ex. 1 | 0.300 | — | — |
| Ingredient of Ex. 2 | — | 0.200 | — |
| Ingredient of Ex. 3 | — | — | 0.150 |
|  | 100.000 | 100.000 | 100.000 |
| Active Sweetener | 0.0300 | 0.0300 | 0.0300 |

Analytical Release Rate

The gums of Examples 4, 5, and 6 were chewed by several individuals for 0, 2, 5, 10 and 20 minutes. The cuds were collected and analyzed for residual sweetner to determine the release rates. The results are tabulated below.

TABLE 1

| Chew Out Test Results | | |
|---|---|---|
|  | Level (%) | % of Orig. Remaining |
| Example 4 (10% Loading): | | |
| Theoretical (0 min.) | 0.0300 | — |
| Analyzed (0 min.) | 0.0190 | 100 |
| 2 min. | 0.0127 | 67 |
| 5 min. | 0.0088 | 46 |
| 10 min. | 0.00060 | 32 |
| 20 min. | 0.00029 | 15 |
| Example 5 (15% Loading): | | |
| Theoretical (0 min.) | 0.0300 | — |
| Analyzed (0 min.) | 0.0184 | 100 |
| 2 min. | 0.0129 | 70 |
| 5 min. | 0.0090 | 49 |
| 10 min. | 0.0062 | 34 |
| 20 min. | 0.0031 | 17 |
| Example 6 (20% Loading): | | |
| Theoretical (0 min.) | 0.0300 | — |
| Analyzed (0 min.) | 0.0169 | 100 |
| 2 min. | 0.0137 | 81 |
| 5 min. | 0.0105 | 62 |
| 10 min. | 0.0065 | 38 |
| 20 min. | 0.0038 | 22 |

In previous tests with similar gum formulas, with crystalline sucralose mixed directly into the gum, some of which are disclosed in application Ser. No. 07/376,0337, the gum retained approximately 20% of its original sucralose level after 20 minutes of chewing. Ethanol and aqueous solutions of sucralose mixed directly into gum produced gums that retained less than 10% of their original level after 20 minutes of chewing. Thus, in comparison, the results in Table 1 show that the codried and encapsulated sucralose of the present invention has a comparable delayed release from chewing gum when compared to mixing crystalline sucralose directly into the gum. However, the sucralose containing ingredient itself has better storage stability than dry, crystalline sucralose. Also, it exhibits slower release than prior art spray dried and solution forms of storage stable sucralose.

In addition to slowing the release rate of sucralose from gum during chewing, the present invention offers certain other practical benefits. The volume of material added is increased by the bulking effect of the PVAc, allowing easier and more homogeneous mixing into the gum. The codried sucralose is stable, allowing long-term storage of the sucralose in this form prior to manufacture of the PVAc blend. This is in contrast to pure, crystalline sucralose, which is somewhat unstable. The PVAc/sucralose ingredient is also stable, both when stored as an ingredient and in the gum. It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A method of producing chewing gum comprising the steps of:
    a) providing a blended sucralose-containing ingredient by
        i) codrying sucralose with a codrying agent;
        ii) homogeneously mixing about 50 to about 97 parts by weight heat softened PVAc with about 3 to about 50 parts by weight of the codried sucralose;
        iii) cooling the homogenous mixture; and
    b) mixing
        i) about 0.02% t about 20% by weight of the chewing gum of the blended sucralose-containing ingredient,
        ii) about 5% to about 80% by weight of the chewing gum of a base,
        iii) about 5% to about 80% by weight of the chewing gum of a bulking agent, and
        iv) about 0.25% to about 5% by weight of a flavoring agent to make the chewing gum composition.

2. The method of claim 1 wherein the PVAc is softened by heating the PVAc before mixing it with the codried sucralose.

3. The method of claim 1 wherein the PVAc is softened by heating after being blended with the codried sucralose.

4. The method of claim 1 further comprising the step of sizing the blended sucralose-containing ingredient to a particle size small enough to be unnoticeable when mixed into a chewing gum composition.

5. The method of claim 1 wherein the blended sucralose containing ingredient has a sucralose level between about 3% and about 50%.

6. The method of claim 1 wherein the blended sucralose containing ingredient has a sucralose levvel of between about 15% and about 35%.

7. The method of claim 1 wherein the blended sucralose containing ingredient has a sucralolse level of between about 20% to about 30%.

8. The method of claim 1 wherein the PVAc has an average molecular weight of between about 7000 MWU and about 100,000 MWU as measured by Gel Permeation Chromatography.

9. The method of claim 1 wherein the PVAc has an average molecular weight of between about 10,000 MWU and about 50,000 MWU as measured by Gel Permeation Chromatography.

10. The method of claim 1 wherein the sucralose is codried by spray drying it with the codrying agent.

11. The method of claim 1 wherein the sucralose is codried by granulating it with the codrying agent.

12. The method of claim 1 wherein the sucralose is codried by freeze drying it with the codrying agent.

13. The method of claim 4 wherein the blended sucralose containing ingredient is sized to less than about 420 microns.

14. The method of claim 4 wherein the blended sucralose containing ingredient is sized to between about 80 microns and about 400 microns.

15. The method of claim 1 wherein the level of sucralose in the gum is between about 0.01% and about 0.5%.

16. The method of claim 1 wherein the codrying agent is selected from the group consisting of maltodextrin, hydroxy propyl methy cellulose, gum arabic, modified starches and hydroxy propyl cellulose.

17. The method of claim 1 wherein the level of sucralose in the codried sucralose is between about 20% and about 80%.

18. A method of making a sucralose-containing ingredient for chewing gum comprising the steps of:
   a) codrying sucralose with a codrying agent,
   b) homogeneously mixing about 50 to about 97 parts by weight head-softened PVAc with about 3 to 50 parts by weight of the codried sucralose, and
   c) cooling the homogenous mixture, leaving a blended sucralose containing ingredient.

19. The method of claim 18 further comprising the step of sizing the blended, dried ingredient to a particle size small enough to be unnoticeable when mixed into a chewing gum composition.

20. The method of claim 18 wherein the PVAc is softened by heating the PVAc, before mixing it with the codried sucralose.

21. The method of claim 18 wherein the PVAc is softened by heating after being blended with the codried sucralose.

22. A chewing gum composition made in accordance with the method of claim 1.

* * * * *

UNITED STATES PATENT AND TRADEMARK OFFICE
CERTIFICATE OF CORRECTION

PATENT NO. : 5,139,798
DATED : August 18, 1992
INVENTOR(S) : ROBERT J. YATKA et al.

It is certified that error appears in the above-indentified patent and that said Letters Patent is hereby corrected as shown below:

On the title page, item [56] References Cited:

Column 2, under "Foreign Patent Documents", please insert the following three lines:

--0 267 809   5/1988   EPO--
--0 273 009   6/1988   EPO--
--0 372 695   6/1990   EPO--.

Column 7, line 36, please delete "sweetner" and substitute therefor --sweetener--.

Column 7, line 65, please delete "07/376,0337" and substitute therefor --07/376,037--.

Column 8:

Claim 1, line 49, please delete "t" and substitute therefor --to--.

Column 9:
Claim 6, line 5, please delete "levvel" and substitute therefor --level--.

Column 9:
Claim 7, lines 7-8, please delete "sucralose containing" and substitute therefor --sucralose-containing--.

UNITED STATES PATENT AND TRADEMARK OFFICE
CERTIFICATE OF CORRECTION

PATENT NO. : 5,139,798
DATED : August 18, 1992
INVENTOR(S) : ROBERT J. YATKA et al.

It is certified that error appears in the above-indentified patent and that said Letters Patent is hereby corrected as shown below:

Column 9:
   Claim 7, line 8, please delete "sucralolse" and substitute therefor --sucralose--.
Column 9:
   Claim 13, lines 26-27, please delete "sucralose containing" and substitute therefor --sucralose-containing--.
Column 9:
   Claim 14, lines 29-30, please delete "sucralose containing" and substitute therefor --sucralose-containing--.
Column 10:
   Claim 16, line 6, please delete "methy" and substitute therefor --methyl--.
Column 10:
   Claim 18, line 15, please delte "head-softened" and substitute therefor --heat-softened--.
Column 10:
   Claim 18, line 18, please delete "sucralose containing" and substitute therefor --sucralose-containing--.

Signed and Sealed this

Eleventh Day of October, 1994

*Attest:*

BRUCE LEHMAN

*Attesting Officer*     *Commissioner of Patents and Trademarks*